3,699,075
SOLUBLE HIGH MOLECULAR WEIGHT POLYIMIDE

Hyman R. Lubowitz, Hawthorne, Calif., assignor to TRW Inc., Redondo Beach, Calif.
No Drawing. Filed Oct. 28, 1970, Ser. No. 84,935
Int. Cl. C08g 20/32
U.S. Cl. 260—49　　　　　　　　　　　　　　3 Claims

ABSTRACT OF THE DISCLOSURE

This invention is directed to aromatic polycarboxylic acids, the anhydrides and isomers thereof, and more particularly, to the use of these acids and anhydrides for the preparation of thermally stable, high-molecular weight polyamides. These polyamides are thermo-oxidatively stable high-molecular weight polyimides which are comparatively soluble in organic solvents. The polyimides are obtained by reacting approximately stoichiometric amounts of the polycarboxylic acid or the anhydrides thereof with a polyfunctional compound selected from the group consisting of polyamines, diisocyanates and combinations thereof.

---

The invention described herein was made in performance of work under a NASA contract and is subject to the provisions of Section 305 of the National Aeronautics and Space Act of 1958, Public Law 85–568 (72 Statute 435; 42 USC 2457).

This invention relates to thermally stable, high-molecular weight polyimides and to the use of novel acids and the anhydrides for the preparation of thermally stable, high-molecular weight polyimides. More specifically, this invention relates to thermo-oxidatively stable high-molecular weight polyimides which are highly soluble in polar solvents. These polyimides may be used to provide tough, flexible, high-modulus resinous materials capable of being fabricated into high-performance films, fibers, coatings, reinforced composites, adhesives, etc.

The novel acids and anhydrides which are useful for preparing the high-molecular weight polyimides may be characterized by the formula:

I.

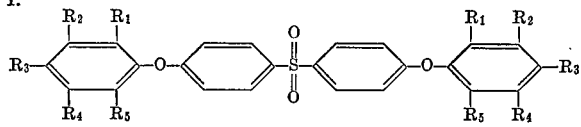

wherein $R_1$, $R_2$, $R_3$, $R_4$ and $R_5$ are either the same or different, and are selected from the class consisting of hydrogen atoms, carboxylic-acid groups and the anhydrides of said carboxylic-acid groups. For purposes of this invention, however, it is important that at least two of the adjacent R groups in each phenyl group are acid groups to give a tetracarboxylic-acid monomer or the dianhydride thereof, e.g., bis(3,4-dicarboxyphenoxyphenyl) sulfone dianhydride.

Generally, thermally stable resins are capable of being fabricated into various products including laminates, adhesives, coatings, films, molded objects and the like and are particularly useful in advance space-vehicles and high-performance aircraft. Thus, thermally stable aromatic and heterocylic materials have been investigated in recent years with considerable progress in attempts to obtain thermally stable high-molecular weight polymers. However, a number of the presently available synthetic polymers have one or more deficiencies which limits their use particularly in the fabrication of reinforced structures or the like. Heretofore, for example, the use of polyimides in preparing reinforced structures required the preparation of polyimide prepolymers, i.e., the polyamide-acid prepolymers which, when cured, results in the release of appreciable amounts of volatile material, due not only to the evaporation of solvent, but also to the imidization reaction in the formation of the polymers. These cured polymers, i.e., polyimides, are substantially insoluble in most organic solvents, and therefore could not be used for fabrication which required solutions for the preparations of coatings, adhesives, films, fibers, reinforced composites, and the like.

Thus, most of the presently available polyimides are obtained from the lower-molecular weight precursors, i.e., prepolymers or amic-acids which are substantially soluble in most organic solvents. However, the prepolymers are highly susceptible to degradation due to oxidation, thermal and hydrolytic conditions. Thus, it has been found that many of these problems can be avoided by using a substantially soluble high-molecular weight polyimide in accordance with this invention which contains thermally stable phenoxyphenyl sulfone segments in the backbone of the polymer chain. These polyimides are particularly useful in preparing solutions of polymers useful as sealants, adhesives, fibers, films, coatings and composites for advanced aerospace structures, etc.

By utilizing these novel acids or the anhydrides thereof, it is possible to obtain polyimides which may be characterized as "stiff" polymers having aromatic and heterocyclic rings in the backbone. These "stiff" polymeric materials were found to be stable under oxidative conditions and to exhibit excellent dimensional stability at elevated temperatures. While the polymeric materials of this invention are cured by conventional means, the amount of volatile material released during the curing process is substantially reduced due to the comparatively high-molecular weight of the monomers. Moreover, because the phenyl groups of the acids are separated by thermally stable linkages which also promote solubility, the fully cured polyimide may be readily coated on various substrates, for example, with little difficulty. The preparation and testing of glass-reinforced laminates, for example, obtained from the polyimides of this invention showed the polymers to have good wetting characteristics and produced products having a comparatively small percent of voids as compared to the presently available materials. Thus, the acids and anhydrides thereof not only improve the thermal and oxidative stability of the polyimides, but also provides a means for preparing otherwise difficult-to-obtain useful objects.

Accordingly, it is an object of this invention to provide polyimides obtained from aromatic polycarboxylic acids and the anhydrides thereof which are oxidative and thermally stable at elevated temperatures.

It is another object of this invention to provide polyimides which are thermo-oxidatively stable and are comparatively soluble in organic polar solvents.

It is still a further object of this invention to provide soluble high-molecular weight polyimides which can be converted to product forms having thermo-oxidative stability, high mechanical properties and a long shelf-life in the varnish form.

It is still a further object of this invention to provide stable high-molecular weight polyimides which are soluble in polar organic solvents, and therefore can be easily fabricated to various product forms. These and other objects of the invention will become apparent from a further and more detailed description of the invention.

More specifically, this invention relates to the preparation of polyimides which are obtained by reacting approximately stoichiometric amounts of at least one polyfunctional compound selected from the group consisting of diamines, diisocyanates and combinations thereof with an acid, the anhydride, and the isomers thereof having the formula:

II.
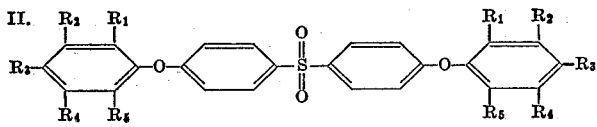

wherein $R_1$, $R_2$, $R_3$, $R_4$ and $R_5$ are either the same or different and are selected from the class consisting of hydrogen atoms, carboxylic-acid groups, the anhydrides and isomers of said acid groups. It is essential, however, in preparing the polyimides of this invention that on each phenyl group, and at least two of the adjacent R groups, i.e., $R_1$, $R_2$, $R_3$, $R_4$, and $R_5$ are carboxylic acid groups or the dianhydride thereof.

The acids and the anhydrides thereof may be prepared by various methods. For purposes of illustration, approximately stoichiometric amounts of an alkali-metal, $C_1$-$C_8$ mono- or polyalkyl substituted phenoxide may be reacted with bis(chlorophenyl) sulfone in an organic solvent as illustrated.

III.
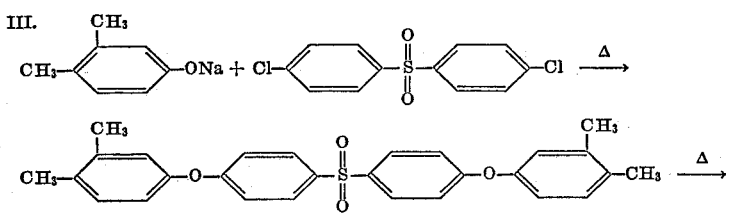

The intermediate bis(3,4-dialkyl phenoxyphenyl) sulfone is heated in the presence of oxygen or a chemical oxidizing agent to obtain the corresponding bis(dicarboxyphenoxyphenyl) sulfone from which the dianhydrides are derived as illustrated.

IV.
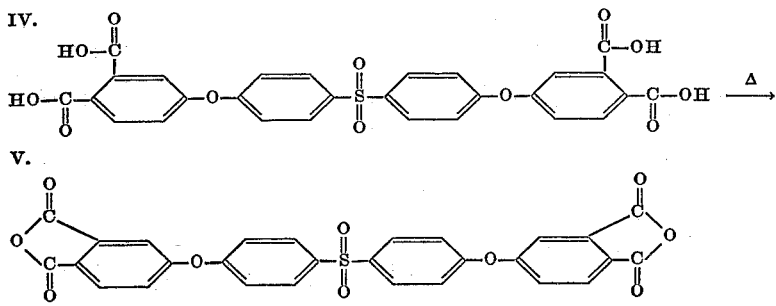

V.

It is obvious that the chemical structure of the final product will depend upon the particular reactants used initially in obtaining the intermediate sulfones. Thus, for example, the 2,3-dialkylphenoxide or the 3,4-dialkylphenoxide, etc., may be used in the initial reaction with the bis(chlorophenyl) sulfone to obtain the corresponding bis (dialkylphenoxyphenyl) sulfones. These intermediate sulfones may be then oxidized in the manner indicated to the corresponding tetracarboxylic acids and the anhydrides thereof.

The following examples illustrate the methods employed in preparing the acids and/or anhydrides in accordance with this invention.

EXAMPLE I

A composition bis(3,4-dimethylphenoxyphenyl) sulfone was prepared by reacting approximately 143.6 parts by weight of bis(p-chlorophenyl) sulfone dissolved in 500 mls. of dimethyl sulfoxide and 86 mls. of chlorobenzene with 158.6 parts by weight of dry sodium 3,4-dimethylphenoxide. This solution was heated for about 4 hours at about 145° C. in an atmosphere of nitrogen. The solution was poured into ice water with stirring. The white solid formed was washed with cold distilled water and filtered. The white solid was then dried in a vacuum at 90° C. and then recrystallized twice in propanol. The product was found to have a melting point of about 128.5° to 130.0° C. The product was analyzed and found to have the following analysis:

Theoretical calculations ($C_{28}H_{26}O_4S$)—Theory (percent): Carbon, 73.33; hydrogen, 5.72. Found (percent): Carbon, 72.93; hydrogen, 5.51.

EXAMPLE II

A composition bis(3,4-dicarboxyphenoxyphenyl) sulfone was prepared by dissolving 45.9 parts by weight of the previously prepared bis(3,4-dimethylphenoxyphenyl) sulfone in a solution containing 500 ml. of pyridine and 100 ml. of water. The solution was heated until refluxed and then 63.2 parts by weight of potassium permanganate was added as was necessary to maintain the reflux temperature. After the addition was completed, the suspension was refluxed for two hours, filtered hot through a diatomaceous earth filter bed, washed with hot pyridine, and then evaporated under a vacuum. The residue was dissolved in 500 ml. of 1.8 normal sodium hydroxide solution. The filtrate from the basic solution was again oxidized and filtered using 63.2 parts by weight of potassium permanganate. The excess permanganate was destroyed with ethanol. The filtrate from this oxidation was cooled to 10° C. and acidified to a pH of 1 with 6 normal hydrochloric acid. The acid solution was allowed to stand overnight. A white precipitate was collected by filtration and washed with 200 ml. of cool water. The wet cake was placed in 500 ml. of water and the mixture heated until the cake had dissolved. The solution was allowed to cool to room temperature at which time the material recrystallized from solution. The crystals were collected and dried under a vacuum over phosphorous pentoxide. The yield was about 18.1 parts by weight of bis(3,4-dicarboxyphenoxyphenyl) sulfone which had a melting point of about 172° C.

The bis(3,4-dicarboxyphenoxyphenyl) sulfone dianhydride was prepared by placing approximately 8 parts by weight of bis(3,4-dicarboxyphenoxyphenyl) sulfone in 150 ml. of acetic anhydride. The solution was heated to boiling, boiled for about 5 minutes, and then allowed to cool. Yellow needles crystallized from the solution. The needles were collected and dried under a vacuum at 150° C. for about one hour. The yield was approximately 70% of bis(3,4-dicarboxyphenoxyphenyl) sulfone dianhydride which had a melting point of about 253.5° to 254° C. The product analyzed as follows:

Theoretical calculation ($C_{28}H_{14}O_{10}S$)—Theory (percent): Carbon, 61.90; hydrogen, 2.60; sulfur, 5.91. Found (percent): Carbon, 61.56; hydrogen, 2.84; sulfur, 5.36.

These sulfone acids, anhydrides and the isomers thereof may be reacted with approximately stoichiometric equivalence, i.e., where the equivalence of the acid or anhydride groups are substantially equal to the amine groups at temperatures ranging up to about 200° C. of polyfunctional compound selected from the group consisting of diamines, diisocyanates and combinations of diamines and diisocyanates in any proportion. A polyimide having an average molecular weight of at least 5,000 may be prepared, for example, by reacting bis(3,4 - dicarboxyphenoxy) sulfone with meta-phenylene diamine to give a polymer having the recurring unit:

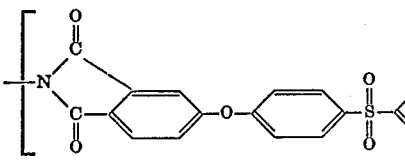

The sulfone acids, anhydrides and isomers thereof of this invention may be reacted with various polyfunctional amines, i.e., aromatic diamines, diisocyanates and combinations of the diisocyanates and diamines in various proportions to obtain a polyimide having the recurring unit:

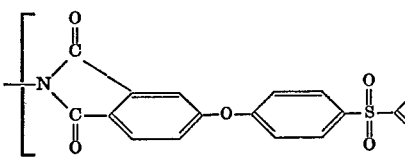

wherein $R_1$ is selected from the group consisting of an aryl radical, an alkyl radical, a cycloalkyl radical, an aralkyl radical, an alkyl aryl radical, an alkylene radical, an arylene radical, a substituted aryl radical, a substituted alkyl radical, a heterocyclic aryl radical, and/or a substituted aralkyl radical of a polyfunctional compound selected from the group consisting of polyfunctional amines, diisocyanates and combinations thereof.

These polyimides are obtained by coreacting the acids or anhydrides thereof with polyfunctional amines and preferably the aromatic diamines containing at least one benzene ring. In addition, the aliphatic amines and preferably aliphatic amines having 5 to 22 carbon atoms may be used in preparing the polymers.

The polyfunctional amines which are particularly preferred are illustrated hereinbelow and include, for example, 2,5-dimethylhexamethylene diamine;
2,5-dimethylheptamethyelne diamine;
5-methyl-nonamethylene diamine;
2,17-diamino-eicosadecane;
1,4-diamino-cyclohexane;
1,10-diamino-1,10-dimethyl decane;
1,12-diamino-octadecane;
para-phenylene diamine;
meta-phenylene diamine;
4,4'-diamino-diphenyl propane;
4,4'-diamino-diphenyl methane;
benzidine;
4,4'-diamino-diphenyl sulfide;
4,4'-diamino-diphenyl sulfide;
4,4'-diamino-diphenyl sulfone;
3,3'-diamino-diphenyl sulfone;
4,4'-diamino-diphenyl ether;
1,5-diamino-naphthalene;
3,3'-dimethoxy benzidine;
2,4-bis(beta-amino-t-butyl)toluene;
bis(para-beta-t-butyl-phenyl)ether;
bis(para-beta-amino-t-butyl-phenyl)ether;
bis(para-beta-methyl-delta-amino-pentyl)benzene;
bis(para-1,1-dimethyl-5-amino-pentyl)benzene;
1-isopropyl-2,4-metaphenylene diamine;
m-xylylene diamine;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4'-dimethylheptamethylene diamine;
2,11-diamino-dodecane;
1,2-bis(3-amino-propoxy)ethane;
2,2-dimethyl propylene diamine;

3-methoxy-hexamethylene diamine;
3,3'-dimethyl benzidine;
methylene dianiline(4,4'-diaminophenyl methane);
oxydianiline(4,4'-diaminophenyl ether);
3,3'-diamino diphenyl;
1,4-diamino napthalene;

4,4-diamino diphenyl ketone;
bis(4-ammino-phenyl)-d,d'-p-xylylene diamine, etc.

In addition to the aromatic diamines which may be used to prepare the polyimides, the aromatic diisocyanates may be used, and include, for example, toluene diisocyanate (either the 2,4-isomer, the 2,6-isomer or mixtures of said isomers); 4,4'-di-o-tolylene diisocyanate; 4,4'-methylene-di-o-tolylisocyanate; m-phenylene diisocyanate; 4-methoxy-1,3-phenylene diisocyanate; 4-chloro-1,3-phenylene diisocyanate; 4,4-diisocyanate; 4,4-diisocyanatodiphenyl sulfone; 1,5-naphthalene diisocyanate; 3,3'-bitolylene-4,4'-diisocyanate; mesitylene diisocyanate; 3,3'-dimethyl - 4,4' - diisocyanatodiphenyl methane; 4-isopropyl 1,3 - phenylene diisocyanate; 2,4' - diisocyanatodiphenyl ether; 4,4'-diisocyantodiphenyl ether; 3,3'-dimethyl-4,4'-diisocyantodiphenyl methane, etc.

The reaction of the acid and/or anhydrides with the diamines, diisocyanates and mixtures thereof may take place in an organic solvent which includes various organic liquids whose functional groups do not react with the polymers. Normally, organic solvents comprising the N,N-dialkylcarboxy amides are useful. The preferred solvents, however, include the lower-molecular weight materials such as N,N-dimethyl formamide, N,N-dimethyl acetamide, N,N-diethyl formamide, N,N-diethyl acetamide, N,N-dimethylmethoxy acetamide, etc. In addition, other solvents which may be used either alone or in combination include the dimethyl sulfoxides, N-methyl-2-pyrrolidone, pyridine, formamide, N-methyl formamide, butyrolactone, etc. These solvents either alone or in combination may be used with other organic liquids including benzene, dioxane, toluene, xylylene, cyclohexane, and other solvents in any proportion. The fully imidized high-molecular weight polymers of this invention may be dissolved in the organic solvent, e.g., in amounts greater than about 20% and used for various purposes, including the preparation of films, fibers, or to fabricate reinforced composites.

EXAMPLE III

In preparing the polymers, the organic diamine is dissolved in a polymerization solvent, i.e., dimethyl formamide, at about 10% w./w. solids. This solution is stirred into an equivalent of bis(3,4-dicarboxyphenoxyphenyl) sulfone dianhydride with an excess ranging up to about 10% of theoretical at room temperatures over a period of about 30 minutes. The solution obtained is stirred at ambient temperatures for periods up to 24 hours during which time the solution builds up to a maximum viscosity. The varnish or solution contains approximately 20% w./w. a comparatively high-molecular weight polyamide-acid which may be used directly to cast films by the "doctoring" technique or to obtain polyamide-acid powders by precipitation with acetone or by solvent stripping. The polyamide-acid prepolymer may be completely imidized by heating in an oven at a temperature ranging up to about 200° C. The completely imidized polymer may be redissolved in various polar solvents to form a varnish of liquid which may be used to prepare films, fibers, coatings, composites, etc.

Characterization of the polyimides prepared from 4,4'-diaminodiphenyl methane and bis(3,4-dicarboxyphenoxyphenyl) sulfone dianhydride is set forth in Table 1.

TABLE 1

Characterization test:

| | Test result |
|---|---|
| (1) Inherent viscosity (0.5% DMF) | 0.4. |
| (2) Molecular weight | >20,000. |
| (3) Thermal stability (TGA) | >300° C. |
| (4) Isothermal weight loss in air at 600° F. (170 hrs.) | 8%. |
| (5) Tensile properties | T/E/Mi >10K p.s.i./ 10/3 M p.s.i.[1] |
| (6) Solubility | DMF, DMSO, HMP, Chlorine. |
| (7) Appearance (film) | Clear. Tough, creasable. |
| (8) Hand (film) | |

[1] Determined on 1 mil thick film samples by triplicate Instron breaks.

EXAMPLE IV

A polyimide was prepared by reacting stoichiometric amounts of bis(3,4-dicarboxyphenoxy) sulfone dianhydride and toluene diisocyanate. The bis(3,4-dicarboxyphenoxyphenyl) sulfone dianhydride was dissolved to about 20% w./w. solids in a polar organic solvent, i.e., dimethyl formamide. The solution was stirred and mixed with an equivalent molar quantity of the diisocyanate solution with the same solid content. The solution was stirred and heated at temperatures ranging up to the reflux temperature of the solvent for a period of about 24 hours. The high-molecular weight polyimide resin formed may be isolated either as a film cast directly from the varnish or by precipitation with acetone. This resin has characteristics similar to the polymers prepared from the diamines as described in Table 1.

EXAMPLE V

A high-molecular weight polyimide was prepared by reacting stoichiometric amounts of bis(3,4-dicarboxyphenoxyphenyl) sulfone dianhydride and meta-phenylene diamine. The fully imidized polymer was soluble in various organic solvents. The characteristics of the polymer are described in Table 2.

TABLE 2

Polyimide properties

Properties [1]:

| | Data |
|---|---|
| $N_{inh}$ (0.5% w./v. $H_2SO_4$) | 0.5. |
| Thermal stability (thermogravimetric analysis in $N_2$ and air, 3° C./min. scan rate; flow=100 cc./min.) | >300° C. |
| Tensile properties | Strength=14K s.i.; elongation to break=5.2%; modulus=448K s.i. |
| Solubility (imidized) | >30% w./w. in DMF. |
| Appearance | Clear, tough. |

[1] Determined on thin-film samples of approximately 2-mil thickness.

EXAMPLE VI

Approximately one equivalent of diphenylmethane diisocyanate was reacted with an equivalent of bis(3,4-dicarboxyphenoxyphenyl) sulfone dianhydride in the presence of a solvent with temperatures ranging from about 70° to 120° C. At these temperatures carbon dioxide evolves from the solvent. After about one hour the reactants are slowly heated to temperatures ranging from about 130° C. to 180° over a period up to about 4 hours. The reaction mixture was allowed to cool to room temperature and a precipitate was obtained. The precipitate was filtered from the solution and dried.

EXAMPLE VII

A solution containing 5.42 g. (0.01 mole) of bis(3,4-dicarboxyphenoxyphenyl) sulfone dianhydride in 15.0 ml. of DMF (previously distilled from and stored over molecular sieves) was transferred into a 50-ml. three-necked round-bottomed flask equipped with a mechanical stirrer and 20-ml. dropping funnel. The solution was stirred vigorously and maintained at <30° C. and a quantity of 2.50 g. (0.01 mole) of bis(4-isocyano-phenyl) methane powder of DMF was added over a 15-minute period. The resulting solution was heated to 155° C. and maintained at this temperature for four hours during which time vigorous stirring was continued. The solution was allowed to cool to room temperature and a thin film was "doctored" onto glass plates. The DMF was removed by heating in a vacuum oven at 200° C. for three hours. The product obtained was a clear film that could be creased without breaking. The reaction in forming the polyimide may be illustrated as follows:

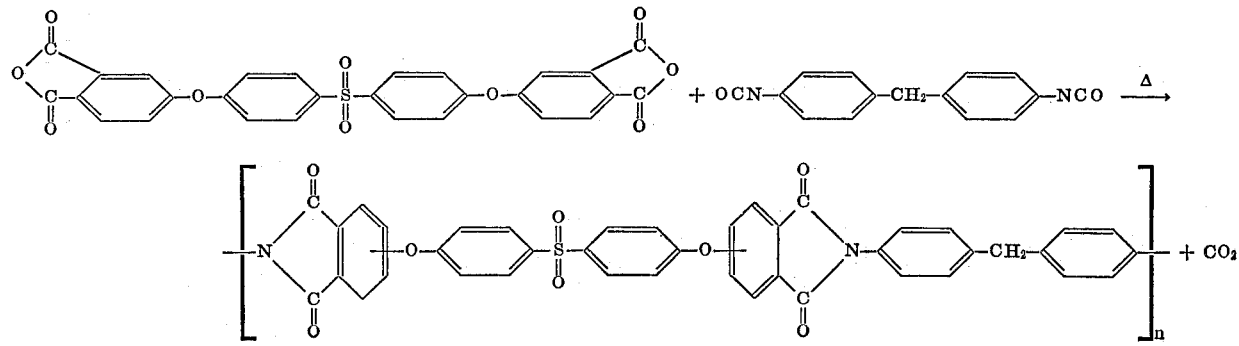

The polymers of this invention may be utilized in the neat form or in combination with any of the well known fillers, including, for example, the fibers and powders of carbon, metal, boron, silicates, asbestos, synthetic materials, metal oxides, and particularly the glass or carbon fibers when used in preparing laminates or composites. These fillers may be used particularly in preparing molded articles or laminate structures wherein the fillers may range from about 0 to 60% and preferably from 10 to 30% by weight of the total composition.

While this invention has been described with respect to a number of specific embodiments, it is obvious that there are other variations and modifications which can be made without departing from the spirit and scope of the invention as particularly set forth in the appended claims.

What is claimed is:

1. A polyimide composition consisting essentially of recurring units:

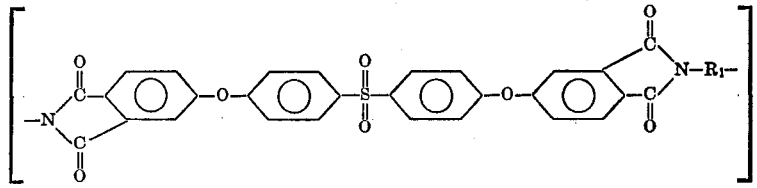

having an average molecular weight of at least 5000 wherein $R_1$ is an organic radical of 5 to 22 atoms selected from the group consisting of divalent aliphatic radicals and divalent aromatic radicals.

2. The polymeric composition of claim 1 further characterized in that $R_1$ has at least one benzene ring.

3. The polymeric composition of claim 1 further characterized in that $R_1$ is an arylene radical containing two benzene rings.

References Cited

UNITED STATES PATENTS

| | | | |
|---|---|---|---|
| 3,179,614 | 4/1965 | Edwards | 260—30.2 |
| 3,314,923 | 4/1967 | Muller et al. | 260—78 |
| 3,493,540 | 2/1970 | Muller et al. | 260—47 |
| 3,539,537 | 11/1970 | Holub et al. | 260—78 |
| 3,563,951 | 2/1971 | Radlmann et al. | 260—47 |

WILLIAM H. SHORT, Primary Examiner

L. L. LEE, Assistant Examiner

U.S. Cl. X.R.

117—124 E, 161 P; 161—227; 260—30.2, 30.4 W, 30.8 R, 32.2, 32.6 N, 33.6 R, 77.5 R, 78 TF, 346.3

UNITED STATES PATENT OFFICE
CERTIFICATE OF CORRECTION

PATENT NO. : 3,699,075
DATED : October 17, 1972
INVENTOR(S) : Hyman R. Lubowitz

It is certified that error appears in the above-identified patent and that said Letters Patent are hereby corrected as shown below:

| | |
|---|---|
| Column 3, line 75 | correct "4" to read -- 44 --. |
| Column 5, line 21 | equation should be numbered -- VI. --. |
| Column 5, line 34 | equation should be numbered -- VII. --. |
| Column 6, line 20 | correct "diamethyl" to read -- dimethyl --. |
| Column 6, line 43 | correct "ammino" to read -- amino --. |
| Column 6, line 57 | correct "diisocyantodiphenyl" to read -- diisocyanatodiphenyl --. |

UNITED STATES PATENT OFFICE
CERTIFICATE OF CORRECTION

PATENT NO. : 3,699,075
DATED : October 17, 1972
INVENTOR(S) : Hyman R. Lubowitz

It is certified that error appears in the above-identified patent and that said Letters Patent are hereby corrected as shown below:

Column 7, Table I — entire test result portion does not synchronize with characterization tests, rewrite as follows:

TABLE 1

| Characterization Test | Test Results |
|---|---|
| 1. Inherent Viscosity (0.5% DMF) | 0.4 |
| 2. Molecular Weight | >20,000 |
| 3. Thermal Stability (TGA) | >300°C |
| 4. Isothermal Weight Loss in Air at 600°F (170 hrs.) | 8% |
| 5. Tensile Properties | T/E/Mi 10 Kpsi/10/3M psi* |
| 6. Solubility | DMF, DMSO, HMP, Chlorine |
| 7. Appearance (film) | Clear |
| 8. Hand (film) | Tough, Creasable |

*Determined on 1 mil thick film samples by triplicate Instron breaks

UNITED STATES PATENT OFFICE
CERTIFICATE OF CORRECTION

PATENT NO. : 3,699,075
DATED : October 17, 1972
INVENTOR(S) : Hyman R. Lubowitz

It is certified that error appears in the above-identified patent and that said Letters Patent are hereby corrected as shown below:

Column 8, Table 2 — entire data portion does not synchronize with Properties, rewrite as follows:

TABLE 2

POLYIMIDE PROPERTIES

| Properties* | Data |
|---|---|
| $N_{inh}$ (0.5% w/v $H_2SO_4$) | 0.5 |
| Thermal Stability (thermogravimetric analysis in $N_2$ and air, 3° C/min scan rate; flow = 100 cc/min | >300°C |
| Tensile Properties | Strength - 14 Ksi<br>Elongation to Break = 5.2%<br>Modulus = 448 Ksi |
| Solubility (Imidized) | >30% w/w/ in DMF |
| Appearance | Clear, Tough |

*Determined on Thin-film samples of approximately 2-mil thickness

Signed and Sealed this fifth Day of August 1975

[SEAL]

Attest:

RUTH C. MASON
Attesting Officer

C. MARSHALL DANN
Commissioner of Patents and Trademarks